United States Patent
Hofrichter (10) Patent No.: US 11,906,385 B2
(45) Date of Patent: Feb. 20, 2024

(54) PHOTONIC DEVICE, METHOD FOR OPERATING A PHOTONIC DEVICE AND METHOD FOR MANUFACTURING A PHOTONIC DEVICE

(71) Applicant: ams International AG, Jona (CH)

(72) Inventor: Jens Hofrichter, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 769 days.

(21) Appl. No.: 17/047,637

(22) PCT Filed: Apr. 12, 2019

(86) PCT No.: PCT/EP2019/059535
§ 371 (c)(1),
(2) Date: Oct. 14, 2020

(87) PCT Pub. No.: WO2019/201800
PCT Pub. Date: Oct. 24, 2019

(65) Prior Publication Data
US 2021/0108978 A1    Apr. 15, 2021

(30) Foreign Application Priority Data
Apr. 16, 2018   (EP) .................................. 18167569

(51) Int. Cl.
*G01L 9/00* (2006.01)
*G02B 6/122* (2006.01)
(Continued)

(52) U.S. Cl.
CPC .......... *G01L 9/0076* (2013.01); *G02B 6/1225* (2013.01); *G02B 6/2935* (2013.01); *G02B 2006/12159* (2013.01)

(58) Field of Classification Search
CPC ... G01L 9/0076; G02B 6/1225; G02B 6/2935; G02B 2006/12159
See application file for complete search history.

(56) References Cited

U.S. PATENT DOCUMENTS 4,235,113 A * 11/1980 Carome ................. G01H 9/004
                                                                385/12
5,262,885 A    11/1993 Steers et al.
(Continued)

FOREIGN PATENT DOCUMENTS

CN    101131450 A    2/2008
CN    102590936 A    7/2012
(Continued)

OTHER PUBLICATIONS

Chinese Decision of Rejection issued is corresponding Chinese Patent Application No. 2019800265268 dated May 6, 2023, 13 pages, with English language translation.
(Continued)

*Primary Examiner* — Ryan D Walsh
(74) *Attorney, Agent, or Firm* — MH2 TECHNOLOGY LAW GROUP LLP (57) ABSTRACT

A photonic device includes a semiconductor substrate and a pressure-sensitive membrane. The pressure-sensitive membrane is arranged in or on the substrate. A photonic structure is at least partly coupled to the membrane and arranged to change an optical property depending on a deformation to be induced by a pressure applied to the membrane.

16 Claims, 4 Drawing Sheets

(51) Int. Cl.
*G02B 6/293* (2006.01)
*G02B 6/12* (2006.01)

(56) References Cited

U.S. PATENT DOCUMENTS

| | | | |
|---|---|---|---|
| 6,014,239 A | 1/2000 | Veligdan | |
| 6,055,080 A | 4/2000 | Fürstenau et al. | |
| 6,567,572 B2 | 5/2003 | Degertekin et al. | |
| 7,134,179 B2 | 11/2006 | Freeman et al. | |
| 7,963,170 B2 * | 6/2011 | Kramer | G01L 1/241 73/705 |
| 8,391,517 B2 | 3/2013 | Avenson et al. | |
| 8,463,084 B2 * | 6/2013 | Kurtz | G01L 9/0079 385/13 |
| 8,531,527 B2 * | 9/2013 | Chang | G01H 9/006 359/578 |
| 8,600,200 B1 * | 12/2013 | Rakich | G02F 1/0126 385/7 |
| 8,875,311 B2 | 10/2014 | Hofrichter et al. | |
| 9,274,283 B1 | 3/2016 | Ellis-Monaghan et al. | |
| 9,479,875 B2 | 10/2016 | Hall et al. | |
| 9,503,820 B2 | 11/2016 | Hall et al. | |
| 9,658,123 B2 * | 5/2017 | Reck | G01L 9/0076 |
| 10,054,745 B2 * | 8/2018 | Webster | G02B 6/1228 |
| 2002/0172447 A1 | 11/2002 | MacDonald et al. | |
| 2006/0034569 A1 | 2/2006 | Shih et al. | |
| 2007/0058901 A1 | 3/2007 | Oohara et al. | |
| 2014/0070082 A1 * | 3/2014 | Guo | G01N 21/59 250/227.14 |
| 2015/0204743 A1 * | 7/2015 | Nieuwland | G01D 5/268 73/705 |
| 2016/0273980 A1 | 9/2016 | Cai et al. | |

FOREIGN PATENT DOCUMENTS

| | | | | |
|---|---|---|---|---|
| CN | 105452832 A | | 3/2016 | |
| JP | H0682325 A | | 3/1994 | |
| JP | H0728006 A | | 1/1995 | |
| JP | 200545463 A | | 2/2005 | |
| JP | 2009543065 A | | 12/2009 | |
| JP | 4995926 B2 | | 8/2012 | |
| JP | 5317373 B2 | | 10/2013 | |
| JP | 5491857 B2 | | 5/2014 | |
| JP | 6418749 B2 | | 11/2018 | |
| JP | 6693759 B2 | | 5/2020 | |
| WO | WO-2005101115 A1 | * | 10/2005 | G02B 6/3536 |
| WO | 2010124400 A1 | | 11/2010 | |

OTHER PUBLICATIONS

Chinese Search Report (with English Translation) in corresponding Chinese Application No. 201980026526.8 dated Nov. 17, 2021, 4 pages.
Chinese First Office Action (with English Translation) in corresponding Chinese Application No. 201980026526.8 dated Nov. 29, 2021, 11 pages.
International Search Report and Written Opinion dated Sep. 9, 2019 in corresponding PCT Application No. PCT/EP2019/059535, 14 pages.
Bicen, B. "Micromachined Diffraction Based Optical Microphones and Intensity Probes With Electrostatic Force Feedback", PhD Georgia Institute of Technology USA, Aug. 2010.
Westerveld, W. "Silicon photonic micro-ring resonators to sense strain and ultrasound", PhD Thesis, TU Delft, The Netherlands, Mar. 2014.
International Search Report and Written Opinion dated Oct. 24, 2019 in corresponding PCT Application No. PCT/EP2019/059535, 14 pages.

* cited by examiner

FIG 8

PHOTONIC DEVICE, METHOD FOR OPERATING A PHOTONIC DEVICE AND METHOD FOR MANUFACTURING A PHOTONIC DEVICE

CROSS-REFERENCE TO RELATED APPLICATIONS

The present application is the national stage entry of International Patent Application No. PCT/EP2019/059535, filed on Apr. 12, 2019, which claims the benefit of priority of European Patent Application No. 18167569.5, filed on Apr. 16, 2018, all of which are hereby incorporated by reference in their entirety for all purposes.

FIELD OF INVENTION

This invention relates to a photonic device, a method for operating a photonic device and to a method for manufacturing a photonic device.

BACKGROUND OF THE INVENTION

Another aspect relates to complementary metal-oxide semiconductor (CMOS) technology, e.g. electrical and optoelectronic circuits manufactured in CMOS technology. For example, the proposed concept relates to a pressure sensor or an acoustic sensor such as a microphone. More specifically, the proposed concept relates to micro-electro-mechanical system, MEMS, microphones which are suitable for integration into mobile devices for the consumer market.

Today most commercially available microphones and pressure sensors are electronic. In fact, the performance and the price point are still more attractive than optical sensors, for example. Although optical microphones offer superior noise performance and dynamic range, their deployment up to now is hampered by the lack of a photonic integration path and the resulting large bill of materials, BOM, of discrete components. Electronic solutions often resort to a capacitive sensor, which can be formed within two or more metallic levels within the back-end of line. While some solutions seek to fully integrate a MEMS sensor on a chip, another approach is to separate the MEMS sensor from the application-specific integrated circuit, ASIC, which can be more cost efficient but limits the noise performance.

Optical approaches use various discrete components because up to now a feasible integration path is missing. Therefore, despite their better performance, optical solutions are not widespread and target niche markets only. Thus, to date, optical microphones and pressure sensors comprise several optical components and resort to complex assembly schemes resulting in a comparably large bill-of-materials and overall system cost.

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the photonic device, method for operating a photonic device and method to manufacture a photonic device as defined in the accompanying claims.

SUMMARY OF THE INVENTION

The following relates to an improved concept in the field of acoustic sensors, e.g., microphones and pressure sensors.

The improved concept provides a photonic device, method for operating a photonic device and a method for manufacturing a photonic device. The photonic device can be considered a special type of optical microphone or pressure sensor. For example, the photonic device is rather photonic than optical in the sense that not a deflection of a membrane is detected but rather a change of optical material properties. This may be achieved by coupling a photonic structure to the membrane that deflects together with the membrane, when an acoustic wave or pressure is applied to membrane. This way, a change in optical properties of the photonic structure can be related to the acoustic wave or pressure acting on the membrane. For example, the proposed photonic device allows for sensing a strain within the material rather than an deflection of the membrane. There may be regions on the photonic device which experience tensile or strain compressive strain when the membrane is bent by pressure or sound pressure. Therefore, the proposed concept allows to sense accurate movements of the membrane by means of a photonic structure.

The photonic structure can be fully integrated into the photonic device thereby providing a so far missing integration path for photonic pressure sensors and microphones. Additionally, an optical sensor can be located within the same device, even in the same substrate. This may be attractive when operating in the red or near-infrared, NIR, wavelengths range from 780 to 950 nm. For example, when operating at 850 nm or 940 nm, silicon photodiodes may be integrated into the same substrate. Furthermore, light sources such as lasers made from gallium arsenide (GaAs) operating in said wavelength range are rather inexpensive and widely available.

In an alternative embodiment, the device may also be operated in the far-infrared wavelength range, e.g. around 1310 nm or around 1550 nm, where InP-based laser sources and Germanium-based photodiodes may be employed, for instance.

Coupling of light to the photonic device can be achieved by optical couplers such as grating couplers for vertical coupling or other edge couplers, such as adiabatic couplers, for instance.

In at least one embodiment a photonic device comprises a semiconductor substrate, a pressure sensitive membrane and a photonic structure. The pressure sensitive membrane is arranged in or on the substrate. The photonic structure is at least partly coupled to the membrane. The photonic structure is arranged to change an optical property depending on a deformation to be induced by a pressure to be applied to the membrane.

Pressure is applied to the pressure sensitive membrane during operation. The pressure may be induced by means of an acoustic wave, for example. In turn, the membrane is deflected under the pressure applied and, at the same time, at least parts of the photonic structure are deflected as the photonic structure is coupled to the membrane. As a consequence the photonic structure changes its optical property depending on the deformation.

The proposed photonic device can be used as an optical microphone or optical pressure sensor. For example, light can be guided within the acoustically active membrane. Moreover, a resonator is not formed in between the acoustically active membrane but rather within the membrane. By acoustic waves the membrane is deflected and regions of the membrane experience some stress or strain. As the optical properties of materials may be dependent on strain, the deflection can be inferred from, e.g., the effective index of refraction. For example, by displacing the membrane a refractive index can be changed as optical parameter.

Previous microphones are either electrical or optical microphones. For example, existing optical microphones sense a deflection of the membrane by using the change of the elongation of an external resonator structure formed between an external reference point and the membrane. Instead, the proposed photonic device employs the deflection of the membrane by measuring the change of optical properties, e.g., induced strain and refractive index. Therefore, light can be guided within the membrane rather than be applied vertically to the membrane and reflected.

The proposed concept features a viable and cost-effective way to form an optical microphone or a pressure sensor by leveraging photonic integration technologies and resorting to mass fabrication methods, such as complementary metal oxide semiconductor, CMOS, production techniques. For example, silicon photodiodes operating at 850 nm (and 940 nm, 1310 nm and 1550 nm), and silicon nitride waveguides can be used. Furthermore, additional components such as an analog amplifier front-end can be integrated into the photonic device. Furthermore, digital functionality may be added into the device. The membrane may be formed using dry etch techniques, e.g. as used in the through-silicon-via, TSV, processing. But also micromachining techniques may be employed (e.g., wet etching using TMAH, KOH, electroplating, surface micromachining, etc.)

Besides a cost benefit, the proposed concept has the advantage that both an optical sensing path and also an optical reference path can be located within the same integrated photonic device, e.g., in the same substrate. In contrast, in other solutions a cavity is formed between a sensing membrane and an external point outside of the sensing element. Therefore, external influences, such as temperature variations, may limit performance.

Static pressure differences with a noise equivalent pressure of 1 Pa or below can be detected. The resolution can be further improved by employing more sophisticated resonator structures, such as cascaded Mach-Zehnder Interferometers, CMZIs, or coupled resonator optical waveguides, CROWs. Concerning the form factor, the proposed concept allows to create ultra-shallow packages with a height of substantially less than 1 mm as the cavity can be formed laterally rather than vertically.

The proposed photonic device lends itself to environmental sensing applications, but also to acoustic sensors in general. The device can be used as optical microphones, which are suitable for integration, e.g., into mobile devices. The application supports creating high-end miniature optical microphones with a low price point as most discrete optical components can be integrated into a CMOS process. Generally, the approach may also be used for pressure sensors. Also, it may be used to measure stress or strain in materials.

In at least one embodiment the photonic structure is coupled to a suspended membrane area of the membrane. This is implemented in a way that at the deformation to be induced by a pressure applied to the membrane also deforms the photonic structure.

In at least one embodiment the photonic structure comprises at least one optical coupler and at least one waveguide. The at least one optical coupler is arranged to input and/or output light to or from the at least one waveguide. The at least one waveguide is configured such as to have an index of refraction, which changes as a function of deformation induced by a pressure applied to the membrane. Moreover, the index of refraction of said waveguide can be larger than the surrounding materials.

In at least one embodiment the at least one optical coupler comprises at least one of a grating coupler for vertical coupling, an etch coupler, and/or an adiabatic coupler.

In at least one embodiment the at least one waveguide comprises at least one of a coherent receiver or an interferometer.

In at least one embodiment the at least one waveguide is implemented as an interferometer and comprises a measurement branch and the reference branch. The measurement branch comprises a measurement section which forms a detection arm and at least partly overlaps with that the membrane. The reference branch comprises a reference section which forms a reference arm. Typically, the reference section does not overlap with the membrane or a suspended membrane area which is pressure sensitive.

During operation the interferometer may use light from a common light source. When travelling along the measurement branch and the reference branch said light can be subject to different optical properties associated with the branches. For example, a phase of light travelling the measurement branch can be changed due to changes in index of refraction. Light travelling the different branches can be superimposed. Due to interference properties of the superimposed light, e.g. intensity, can be used as a measure of waveguide and, thus, membrane deflection.

In at least one embodiment the measurement and reference branches are arranged as a Mach-Zehnder interferometer or cascaded Mach-Zehnder interferometer.

In at least one embodiment the measurement and reference branches are arranged as a ring resonator or racetrack resonator interferometer.

In at least one embodiment the photonic device further comprises an optical sensor which is coupled to the photonic structure by means of at least one optical coupler.

In at least one embodiment the photonic device further comprises a light source which is coupled to the photonic structure by means of at least one optical coupler.

In at least one embodiment a method for operating a photonic device employs a photonic device which comprises a pressure sensitive membrane. The membrane is arranged in or on the substrate. A photonic structure at least partly is coupled to the membrane. The method involves applying a pressure to the membrane and detecting a change of an optical property of the photonic structure. The detection depends on a deformation which is induced by the pressure applied to the membrane.

In at least one embodiment the method further comprises emitting light by means of a light source. The emitted light is coupled into an input side of the photonic structure by means of an optical coupler. Then light is coupled out at an output side of the photonic structure by means of another optical coupler. For example, light travels along the photonic structure between the input side and the output side. Finally, light from the output side is detected by means of an optical sensor.

In at least one embodiment the photonic structure comprises at least one waveguide, which is coupled to the membrane. The waveguide is configured to have an index of refraction, which changes as a function of the formation introduced by the pressure applied to the membrane. The optical sensor detects changes of light intensity depending on the index of refraction of the at least one waveguide.

In at least one embodiment a method for manufacturing a photonic device comprises providing a semiconductor substrate and arranging a pressure sensitive membrane in or on the substrate. The photonic structure is coupled at least partly to the membrane. The photonic structure is configured to change an optical property depending on a deformation to be induced by the pressure applied to the membrane.

In at least one embodiment the semiconductor substrate is made from silicon and the photonic structure is made from silicon dioxide, silicon nitride or any combination thereof.

Further implementations of the method for operating a photonic device and the method to manufacture a photonic device are readily derived from the various implementations and embodiments of the photonic device and vice versa.

In the following, the concept presented above is described in further detail with respect to drawings, in which exemplary embodiments are presented.

In the exemplary embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

DETAILED DESCRIPTION

Figure 1:
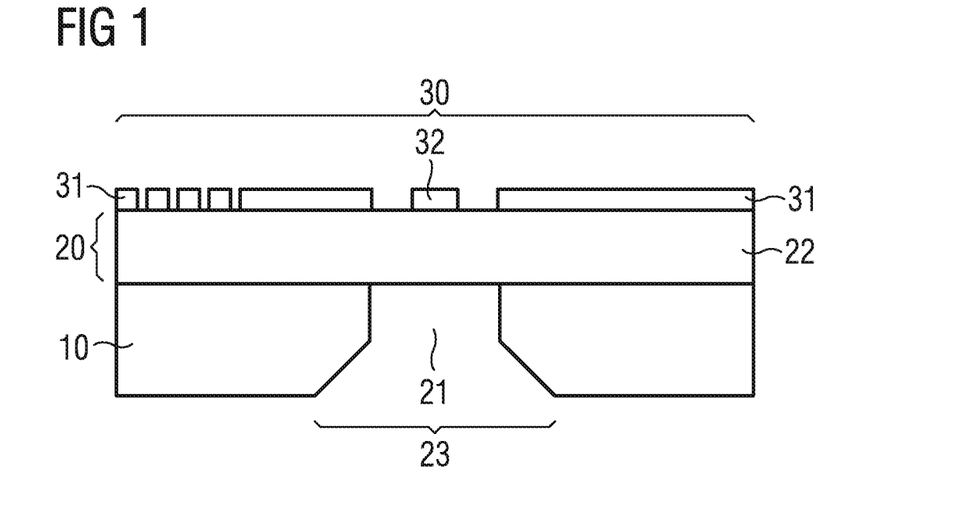
FIG. 1 shows a cross-section of an embodiment of a photonic device.

FIG. 1 shows a cross-section of an embodiment of a photonic device. The photonic device comprises a substrate 10, a membrane 20 and a photonic structure 30. The substrate 10 comprises silicon, for example, and serves as a carrier to mechanically support and electrically connect components of the photonic device, e.g., by providing conductive tracks, pads and other features. For example, the substrate 10 comprises a printed circuit board, PCB, and provides electrical connectivity of pads to package leads on a bottom side of the substrate 10 (not shown). Electrical connections such as wire bonds, or through silicon vias, can be provided to electrically connect electrical components of the photonic device with the substrate 10, e.g., a backside of the substrate 10.

The membrane 20 is arranged on the substrate 10 and is made pressure-sensitive. A recess 21, or cavity, is provided within the substrate 10 and allows the membrane to move or deform when a pressure is applied to the membrane. In this example embodiment the membrane is located within a back-end of line layer 22. The back-end of line layer constitutes a semiconductor layer where individual devices such as transistors, capacitors, resistors, etc. can be interconnected with wiring provided by the substrate 10.

The photonic structure 30 is located within or on top of the membrane. A photonic structure may not necessarily be coupled to the membrane along its whole profile. Rather at least parts of the photonic structure are coupled to the membrane. Furthermore, the photonic structure comprises at least one optical coupler 31 and at least one waveguide 32. For example, at least parts of the waveguide are located within or on top of a suspended membrane area 23 as depicted. The optical couplers are arranged for input and output of light into and out of the back-end of line layer 22 and/or the substrate 10 as well as the waveguide. In this embodiment, the photonic structure is made from silicon nitride, silicon dioxide, or any combination thereof.

The optical coupler 31 comprises a grating coupler, edge coupler, inverted taper or adiabatic coupler, for example. Typically, the optical coupler 31 is adjusted to receive light which is emitted by a light source associated with the photonic device, e.g. integrated into the photonic device or be electronically connected to the device as an external component.

The waveguide 32 can be considered a structure that has an optical property which changes in a characteristic way when the structure is deformed, e.g. under pressure. Deformation may be the result of stress and strain, such as tensile strain and compressive strain, for example. Such deformation may result in a change of index of refraction of the waveguide. Thus, index of refraction is one possible optical property that may change under pressure. The waveguide can be provided within the membrane 20 or back-end of line layer 22, e.g. structured within a limited thickness at a surface or flush with a surface thereof. The waveguide can also be provided on top of a surface of the membrane 20 or back-end of line layer 22, e.g. protruding from the surface. Waveguides include resonators or interferometers, for example.

The photonic device shown in FIG. 1 can be complemented with additional electronic components. For example, a light source 40 can be either integrated into the photonic device or be electronically connected to the device as an external component. For example, the light source may be arranged on and electrically connected to the substrate 10 or the back-end of line layer 22, e.g. to the PCB. The light source may include a laser diode, such as a VCSEL or VECSEL, a super luminescent diode, SLED, and the like. These types of lasers are configured to emit light at a specified wavelength, e.g. in the UV, visual or infrared part of the electromagnetic spectrum. For example, vertical-cavity surface-emitting lasers, VCSEL, or vertical-external-cavity surface-emitting-lasers, VECSEL, predominantly emit in the IR, e.g. at 940 nm.

Furthermore, the photonic device may also comprise an optical sensor 41 which can be either integrated into the photonic device or be electronically connected to the device as an external component. The optical sensor comprises a photodiode or an array of photodiodes, for example.

Furthermore, the additional electronic components may include control logic, a state machine, a microprocessor and the like. They may also comprise additional components such as analog-to-digital converters, analog or digital frontends, amplifiers integrated in the photonic device, e.g. the substrate 10, and may be interconnected to the printed circuit board to provide electrical communication to the individual components of the photonic device. Implementing additional electronic components into the photonic device has the benefit of inherently low noise and high speed operation.

Figure 2:
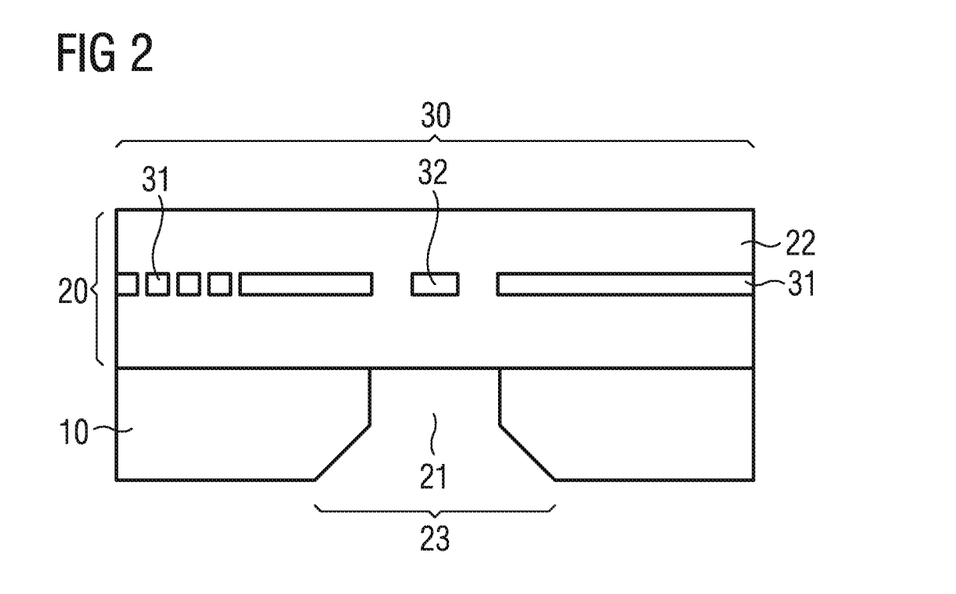
FIG. 2 shows a cross-section of another embodiment of a photonic device.

FIG. 2 shows a cross-section of another embodiment of a photonic device. This embodiment is based on the one shown in FIG. 1. However, the membrane 20 is modified and is comprised by the back-end of line layer 22. Instead of using a silicon nitride layer located at a top of the back-end-of-line, a silicon nitride layer located in between or within the back-end of line is employed. For example, in a shallow-trench isolation, STI, process silicide block layers may be used. Using these silicon nitride layers has the advantage that no additional silicon nitride deposition or patterning shall be carried out. Only a substrate removal process may be required to release the membrane comprising the photonic structures.

Figure 3:
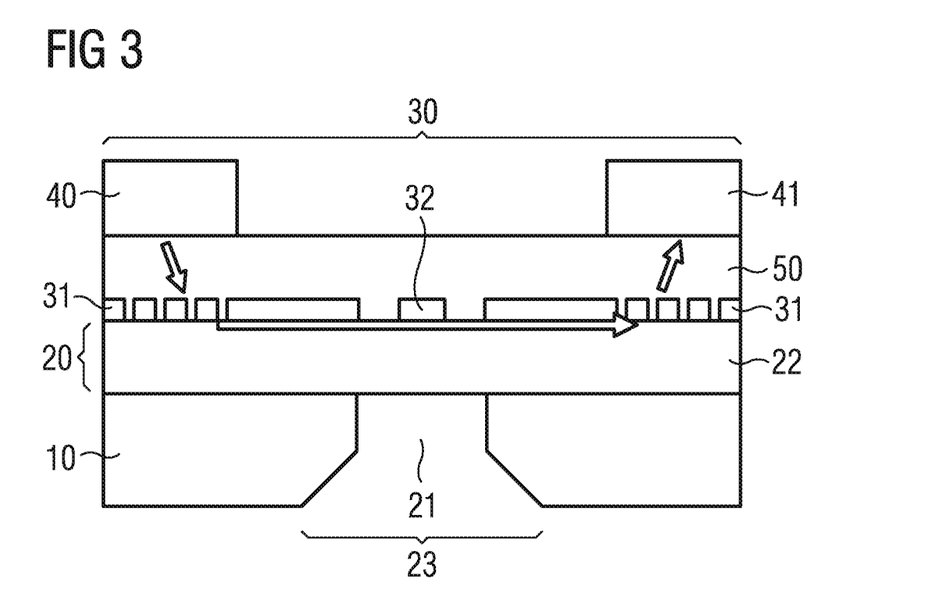
FIG. 3 shows a cross-section of another embodiment of a photonic device.

FIG. 3 shows a cross-section of another embodiment of a photonic device. This embodiment is based on the one shown in FIG. 1. In addition, the light source 40 and the optical sensor 41 are shown. An adhesive or glue layer 50 is arranged over the membrane and photonic structure 30. In fact, the photonic structure 30 is partly or fully embedded in the adhesive or glue layer 50. Both the light source 40 and the optical sensor 41 are arranged on top of the adhesive or glue layer 50. The arrows depicted in the drawing indicate a possible optical path for the light to propagate through the photonic device.

Figure 4:
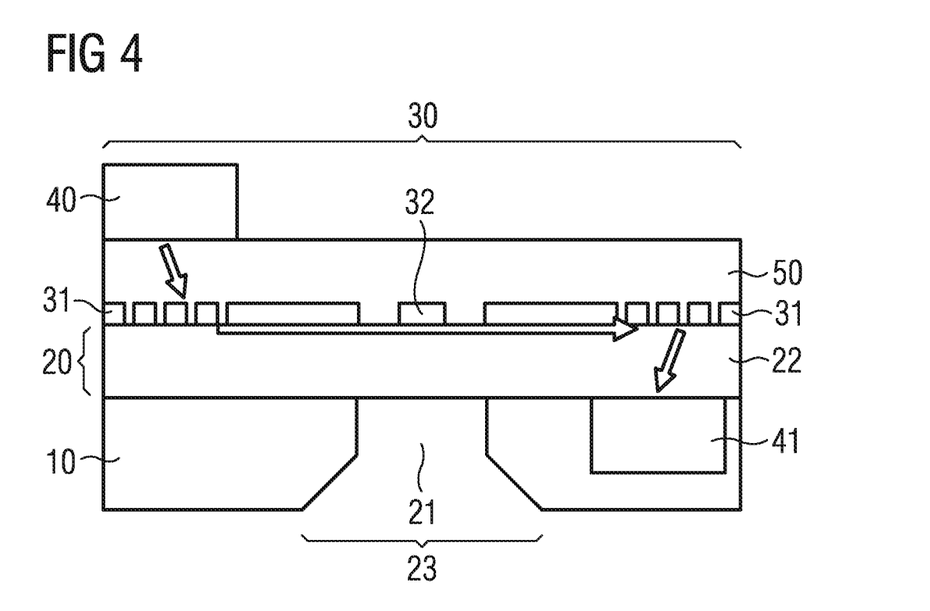
FIG. 4 shows a cross-section of another embodiment of a photonic device.

FIG. 4 shows a cross-section of another embodiment of a photonic device. This embodiment is based on the one shown in FIG. 3. However, the optical sensor 41 may also be integrated into the photonic device, e.g. the same substrate or die. This can be attractive when intended applications deal with red to near-IR light around 850 nm, where a substrate such as silicon has a transmission window for said wavelengths. The arrows depicted in the drawing indicate a possible optical path for the light to propagate through the photonic device.

The optical paths for the light to propagate through the photonic device shown in FIGS. 3 and 4 can be used to illustrate a possible mode of operation of the photonic devices, respectively. Light is emitted by the light source 40, e.g. a laser, and coupled into the photonic structure 30 via the optical coupler 31. Once coupled into the waveguide light travels along the waveguide 32 and eventually is coupled out via another optical coupler 31. Light which has been coupled out in this way may then eventually be detected by the optical sensor 41, e.g. a photodiode.

At least parts of the waveguide are located within or on top of the suspended membrane area 23. In fact, the waveguide 32 and the membrane 20 are coupled at least in this area and render the photonic structure sensitive to pressure. In other words, the photonic structure is acoustically active, i.e. when pressure is applied to the membrane, then the membrane, and the photonic structure, are displaced. For example, acoustic waves are deflected at the membrane and layers of the membrane experience stress or strain. Due to the coupling of membrane and photonic structure stress or strain is induced to the photonic structure as well. As the optical properties of materials are often dependent on strain, the deflection of the membrane can be inferred from e.g., the effective refractive index of the waveguide. In on other words, by displacing the membrane the refractive index is changed.

Figure 5:
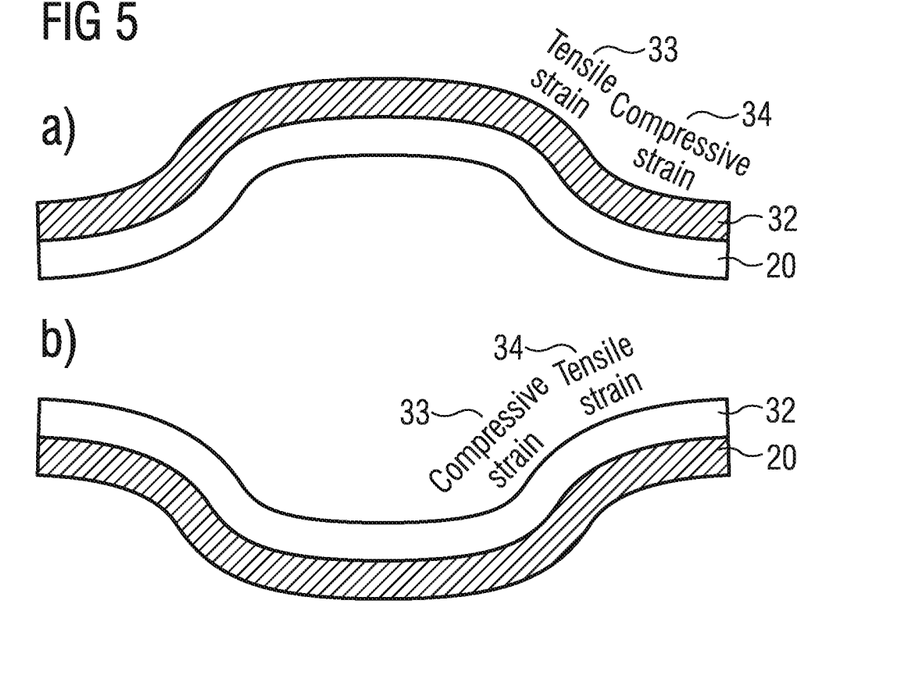
FIG. 5 shows a schematic representation of membrane deformation.

FIG. 5 shows a schematic representation of membrane deformation. The drawing depicts two states (a) and (b) of the membrane and waveguide. In state (a) the membrane is bent upwards under the pressure applied. As the waveguide is coupled to the membrane there is a region 33 on the waveguide, which experiences tensile strain when the membrane is bent upwards. There may also be a region 34 on the waveguide, which experiences compressive strain. In state (b) the membrane is bent downwards under the pressure applied. The same regions 33, 34 experience compressive and tensile strain, respectively. The strain induced leads to changes of material properties which can be detected as changes in index of refraction, for example. Thus, the proposed concept employs detection of changes in optical parameters rather than an elongation of the membrane. These changes in the photonic structure can be detected accurately and thus allow to sense accurate movements of the membrane.

Figure 6:
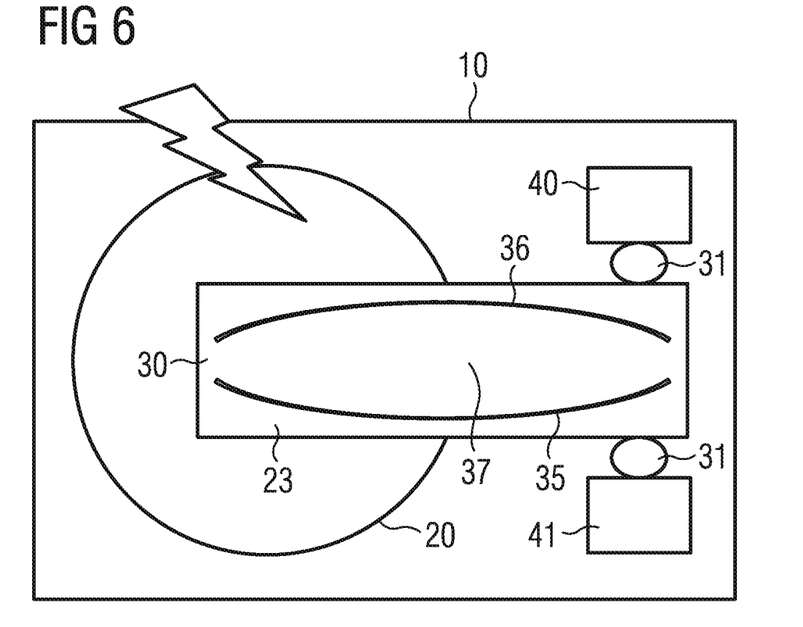
FIG. 6 shows a schematic top-view of an embodiment of a photonic device.

FIG. 6 shows a schematic top-view of an embodiment of photonic device. The drawing shows the membrane 20 implemented in a disc-like geometry above the substrate 10. The photonic structure 30 is depicted as an essentially rectangular layer, e.g. back-end of line layer 22, which comprises the waveguide 31. The photonic structure overlaps with and is coupled to the membrane at least in the suspended membrane area 23 as depicted. The waveguide comprises two branches 35, 36 which can be considered forming an optical cavity 37. As discussed above, the waveguide can be provided within the membrane 20 or back-end of line layer 22 or top of a surface of the membrane 20 or back-end of line layer 22. Furthermore, the drawing shows the light source 40, e.g. a laser, a first optical coupler 31 connecting the light source and the photonic structure, and a second optical coupler 31 connecting the photonic structure to the optical sensor 41, e.g. a photodiode. The photonic device may be implemented as shown in FIGS. 3 and 4, for example.

During operation an acoustic signal (indicated as an arrow in the drawing) can be applied to the membrane 20. The membrane 20 is sensitive to pressure and, thus, sensitive to acoustic signals. The photonic structure 30, which is at least partially overlapping with the membrane area 23, is sensitive to acoustic signals due to its coupling to the membrane 20. Light is emitted by the light source 40 and coupled to the waveguide 30 via the first optical coupler 31.

The two branches 35, 36 which can be considered forming the optical cavity 37 can be arranged as a measurement branch 35 and a reference branch 36 of an interferometer. For example, once the light is coupled into the photonic structure a first fraction travels along the reference branch 36, and a second fraction travels along the measurement branch 35. At least part of the measurement branch 35 runs along the membrane and, thus, forms an acoustically sensitive optical path. The reference branch 36, however, may be arranged on or in the membrane in a way that is decoupled from the suspended membrane area 23 and, thus, may not form an acoustically sensitive optical path.

As discussed above a pressure-induced deformation of the membrane 20, e.g. due to acoustic waves applied to the membrane, leads to changes of material properties such as changes in index of refraction of the waveguide. These changes manifest themselves in a phase shift between the first and second fractions of light, i.e. light traveling the measurement branch 35 and reference branch 36 of the interferometer. Light from the two branches are then combined and coupled to the optical sensor 41 using the second optical coupler 31, which may be different from the first coupler. Combining the two branches will superpose the first and second fractions of light. Depending on the phase shift induced in the waveguide 32 interference of the light results in a characteristic intensity. In fact, changes in acoustic signal result in a modulation of light and can be detected as changes in light intensity. Forming an on-chip interferometer can achieve a large signal swing and supports suppressing, e.g., relative intensity noise of the light source to achieve a good noise performance.

Figure 7:
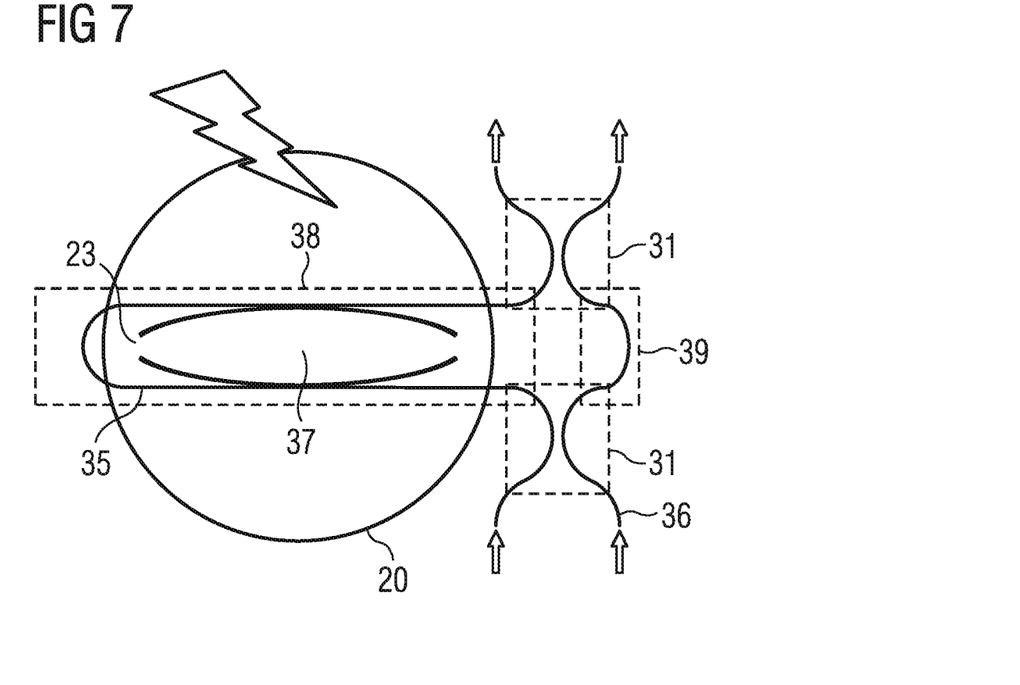
FIG. 7 shows a schematic top-view of an embodiment of an interferometer for a photonic device.

FIG. 7 shows a schematic top-view of an embodiment of an interferometer for a photonic device. One possible way to integrate the interferometer into the photonic device is to arrange the measurement and reference branches 35, 36 in a Mach-Zehnder configuration or as Mach-Zehnder interferometer, MZI.

The measurement and reference branches 35, 36 are separate and non-overlapping in this configuration. Each branch has a certain length which may be the same but in general one branch, such as the measurement branch, is longer. Phase shift due to travelling along the two branches without any acoustic wave or pressure applied to the photonic structure can be considered as known. The measurement and reference branches 35, 36 comprise coupling sections.

A first coupling section forms the first optical coupler or input coupler. In the first coupling section the measurement and reference branches 35, 36 are arranged or bent into close proximity to each other. The branches are close enough such that a fraction of light traveling along the reference branch 36 can be coupled out and then coupled into the measurement branch 35. A second coupling section forms the second optical coupler or output coupler. In the second coupling section the measurement and reference branches 35, 36 are arranged or bent into close proximity to each other. The branches are close enough such that a fraction of light traveling along the measurement branch 35 can be coupled out and then coupled into the reference branch 36. However, the measurement and reference branches 35, 36 do not contact each other in the coupling sections.

Furthermore, a measurement section 38 of the measurement branch 35. The measurement section forms a detection arm and at least partly overlaps with the membrane, e.g. along the suspended membrane area 23. The measurement section forms an optical cavity which can be considered a pressure-sensitive part of the photonic structure. In the Mach-Zehnder configuration the optical cavity can be considered an open loop. On the other side a reference section 39 is framed by the first and second coupling sections and forms a reference arm and does not overlap with the suspended membrane area 23. The reference section can be considered a pressure-insensitive part of the photonic structure.

In operation, the light source emits a beam of light to which is input at an input side of the reference branch 36. This beam of light is split by the first coupler or input coupler such that the first fraction travels along the measurement branch 35 while the second fraction continues to travel along the reference branch 36. Eventually, an acoustic wave or pressure is applied to the membrane 20 and changes the optical properties of the detection arm as discussed above. The first and second fractions of light join again at the second coupler or output coupler 31. Some of the light of the first fraction continues along the measurement branch 35 and leaves the branch at a first light output. Some of the light of the first fraction, however, is coupled out of the measurement branch 35 and coupled into the reference branch 35 by means of the second coupler or output coupler 31. This coupled out first fraction of light superimposes light of the second fraction which has traveled along the reference branch 36 all along. The superposition results in interference. Depending on the phase shift induced between the measurement and reference branches, light of a characteristic intensity leaves the reference branch at a second light output. A comparison of light intensities provided at the first and the second light output provides a measure of the acoustic signal or pressure which has been applied to the membrane in the first place.

Figure 8:
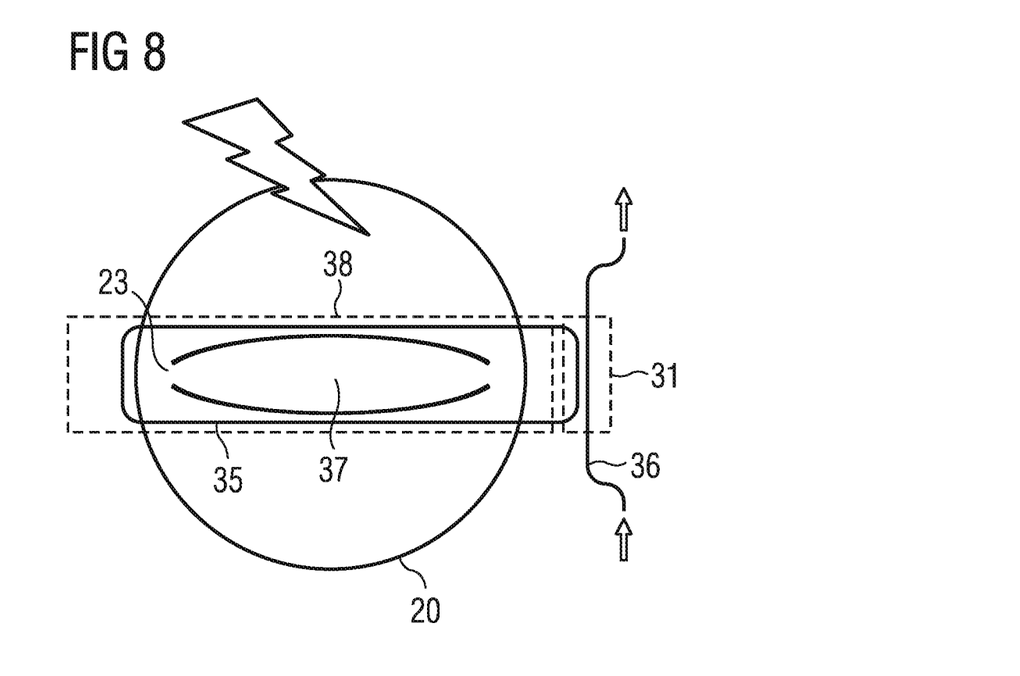
FIG. 8 shows another schematic top-view of an embodiment of an interferometer for a photonic device.

FIG. 8 shows another schematic top-view of an embodiment of an interferometer for a photonic device. Another possible way to integrate the interferometer into the photonic device is to arrange the measurement and reference branches 35, 36 in a ring resonator or racetrack resonator configuration. The measurement and reference branches 35, 36 are again separate and non-overlapping in this configuration. Each branch has a certain length which may be the same but in general one branch such as the measurement branch is longer. Phase shift due to travelling along the two branches without any acoustic wave or pressure applied to the photonic structure can be considered as known. The measurement and reference branches 35, 36 comprise a coupling section.

A coupling section forms the first optical coupler 31. In the coupling section the measurement and reference branches 35, 36 are arranged or bent into close proximity to each other. The branches are close enough such that a fraction of light traveling along the reference branch 36 can be coupled out and then coupled into the measurement branch 35 and vice versa. The measurement and reference branches 35, 36 do not contact each other in the coupling section.

Furthermore, a measurement section of the measurement branch 35. The measurement section forms a detection arm and at least partly overlaps with the membrane, e.g. along the suspended membrane area 23. The measurement section forms the optical cavity which can be considered a pressure-sensitive part of the photonic structure. In the ring resonator or racetrack resonator configuration the optical cavity can be considered a closed loop. A reference section can be considered a pressure-insensitive part of the photonic structure.

In operation, the light source emits a beam of light which is input at an input side of the reference branch 36. This beam of light is split by the optical coupler 31 such that a first fraction travels along the measurement branch 35 while a second fraction continues to travel along the reference branch 36. Eventually, an acoustic wave or pressure is applied to the membrane and changes the optical properties of the detection arm as discussed above. The first and second fractions of light join again at the same optical coupler 31. Some of the light of the first fraction is coupled out of the measurement branch 35 and coupled into the reference branch 35 by means of the optical coupler. This coupled out fraction of light superimposes with light of the second fraction which has traveled along the reference branch 36 all along. The superposition results into interference. Depending on the phase shift induced between the measurement and reference branches, light of a characteristic intensity leaves the reference branch 36 at a second light output. The intensity of light output provides a measure of the acoustic signal or pressure which has been applied to the membrane in the first place.

The invention claimed is:

1. A photonic device comprising:
   a semiconductor substrate,
   a pressure-sensitive membrane arranged in or on the substrate, and
   a photonic structure at least partly coupled to the membrane, wherein
   an optical property of the photonic structure is changed depending on a deformation to be induced by a pressure applied to the membrane,
   the optical property of the photonic structure is changed due to tensile strain and compressive strain,
   the optical property which is changed is an index of refraction of the photonic structure, and the deformation induced by the pressure applied to the membrane results in a change of the index of refraction of the photonic structure.

2. The photonic device according to claim 1, wherein the photonic structure is coupled to a suspended membrane area of the membrane such that a deformation to be induced by a pressure applied to the membrane deforms the photonic structure.

3. The photonic device according to claim 1, wherein the photonic structure comprises at least one optical coupler and at least one waveguide, wherein:
the least one optical coupler is arranged to input and/or output light to the at least one waveguide, and
the at least one waveguide is configured to have an index of refraction, which changes as a function of deformation to be induced by a pressure applied to the membrane.

4. The photonic device according to claim 3, wherein the at least one optical coupler comprises at least one of a grating coupler for vertical coupling, an edge coupler, an adiabatic coupler.

5. The photonic device according to claim 3, wherein the waveguide comprises at least one of a coherent receiver or an interferometer.

6. The photonic device according to claim 5, wherein the waveguide, implemented as interferometer, comprises a measurement branch and a reference branch,
the measurement branch comprises a measurement section which forms a detection arm and at least partly overlaps with the membrane, and
the reference branch comprises a reference section which forms a reference arm.

7. The photonic device according to claim 6, wherein the measurement and the reference branches are arranged as a Mach-Zehnder interferometer or cascaded Mach-Zehnder interferometer.

8. The photonic device according to claim 6, wherein the measurement and the reference branches are arranged as a ring resonator or racetrack resonator interferometer.

9. The photonic device according to claim 1, further comprising an optical sensor which is coupled to the photonic structure by means of at least one optical coupler.

10. The photonic device according to claim 1, further comprising a light source which is coupled to the photonic structure by means of at least one optical coupler.

11. An optical microphone comprising at least one photonic device according to of claim 1.

12. A method for operating a photonic device, wherein the photonic device comprises a pressure-sensitive membrane arranged in or on a substrate and a photonic structure at least partly coupled to the membrane, the method comprising:
applying a pressure to the membrane,
detecting a change of an optical property of the photonic structure depending on a deformation induced by the pressure applied to the membrane, wherein the photonic structure is arranged to change the optical property due to tensile strain and compressive strain, and
changing the optical property which is an index of refraction of the photonic structure, and wherein
the deformation induced by the pressure applied to the membrane results in a change of the index of refraction of the photonic structure.

13. The method according to claim 12, further comprising:
emitting light by means of a light source,
coupling the emitted light into an input side of the photonic structure by means of an optical coupler,
coupling light out at an output side of the photonic structure by means of another optical coupler, and
detecting light from the output side by means of an optical sensor.

14. The method according to claim 13, wherein the photonic structure comprises at least one waveguide coupled to the membrane, which is configured to have an index of refraction which changes as a function of deformation induced by the pressure applied to the membrane and wherein the optical sensor detects changes of light intensity depending on the index of refraction of the at least one waveguide.

15. A method for manufacturing a photonic device, comprising:
providing a semiconductor substrate,
arranging a pressure-sensitive membrane in or on the substrate, and
coupling a photonic structure at least partly to the membrane, wherein the photonic structure is arranged to change an optical property depending on a deformation to be induced by a pressure applied to the membrane, wherein the photonic structure is arranged to change the optical property due to tensile strain and compressive strain, and wherein
the optical property which is changed is an index of refraction of the photonic structure, and
the deformation induced by the pressure applied to the membrane results in a change of the index of refraction of the photonic structure.

16. The method according to claim 15, wherein the semiconductor substrate is made from silicon and the photonic structure is made from silicon dioxide, silicon nitride or any combination thereof.

* * * * *